United States Patent
Baumgart et al.

(10) Patent No.: US 6,388,229 B1
(45) Date of Patent: May 14, 2002

(54) METHOD FOR LASER TEXTURING MAGNETIC RECORDING DISK

(75) Inventors: Peter Michael Baumgart, San Jose; James Hammond Brannon, Palo Alto; Tim Minvielle, San Jose; Iraj Kakesh Pour, San Jose; Timothy Carl Strand, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,549

(22) Filed: Aug. 13, 1999

(51) Int. Cl.$^7$ ................................................ B23K 26/04
(52) U.S. Cl. ........................ 219/121.62; 219/121.83; 219/121.66; 360/135
(58) Field of Search ...................... 219/121.62, 121.61, 219/121.6, 121.76, 121.83, 121.65, 121.66; 360/135

(56) References Cited

U.S. PATENT DOCUMENTS

| | | | |
|---|---|---|---|
| 5,062,021 A | 10/1991 | Ranjan et al. ............... 360/135 |
| 5,539,213 A | * 7/1996 | Meeks et al. .......... 250/559.23 |
| 5,550,696 A | 8/1996 | Nguyen ....................... 360/135 |
| 5,586,040 A | 12/1996 | Baumgart et al. ..... 364/474.08 |
| 5,595,791 A | 1/1997 | Baumgart et al. .......... 427/554 |
| 5,658,475 A | 8/1997 | Barenboim et al. .... 219/121.77 |
| 5,699,160 A | 12/1997 | Barenboim et al. ......... 356/359 |
| 5,822,211 A | 10/1998 | Barenboim et al. .... 364/474.08 |
| 5,830,514 A | 11/1998 | Barenboim et al. ...... 425/174.4 |
| 5,875,084 A | 2/1999 | Baumgart et al. .......... 360/135 |
| 5,877,858 A | * 3/1999 | Kerstens et al. ............ 356/357 |
| 5,951,891 A | * 9/1999 | Barenboim et al. .... 219/121.68 |
| 5,981,902 A | * 11/1999 | Arita et al. ............. 219/121.68 |

* cited by examiner

Primary Examiner—M. Alexandra Elve
(74) Attorney, Agent, or Firm—Robert O. Guillot; Oppenheimer Wolff & Donnelly LLP

(57) ABSTRACT

A method for controlling the laser texturing of a magnetic disk by using a texturing laser system to create texturing bumps and an analyzing laser system to determine texture bump height and to provide feedback to the texturing laser system. From an angular distribution of an array of diffracted light intensities of the texturing bumps, the intensity of a first diffraction peak (Int1) and its array position (P1) are determined and utilized to calculate the average bump height h according to the equation:

$$h = A/P1 + B(Int1) + C$$

where A, B and C are constants that are determined for a batch of disks by taking a representative sample of disks and texturing them with differing laser energies within the energy level range.

6 Claims, 2 Drawing Sheets

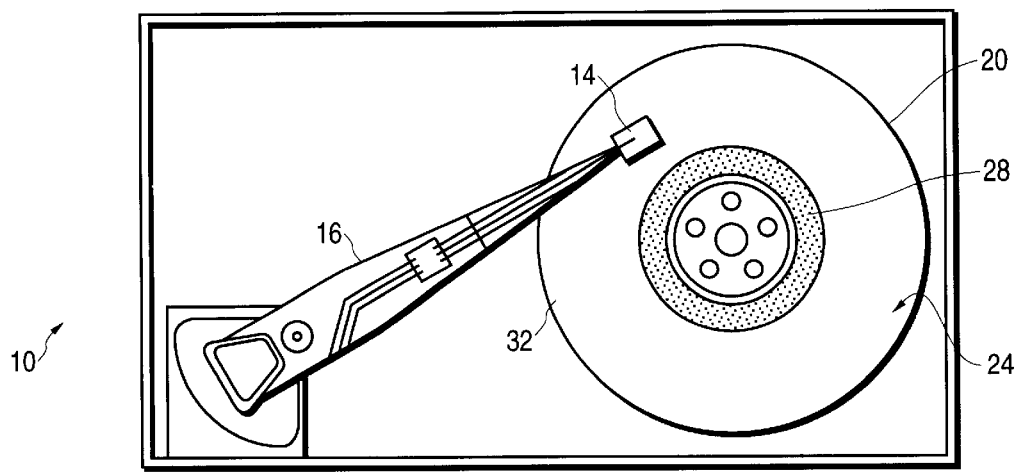
FIG.1
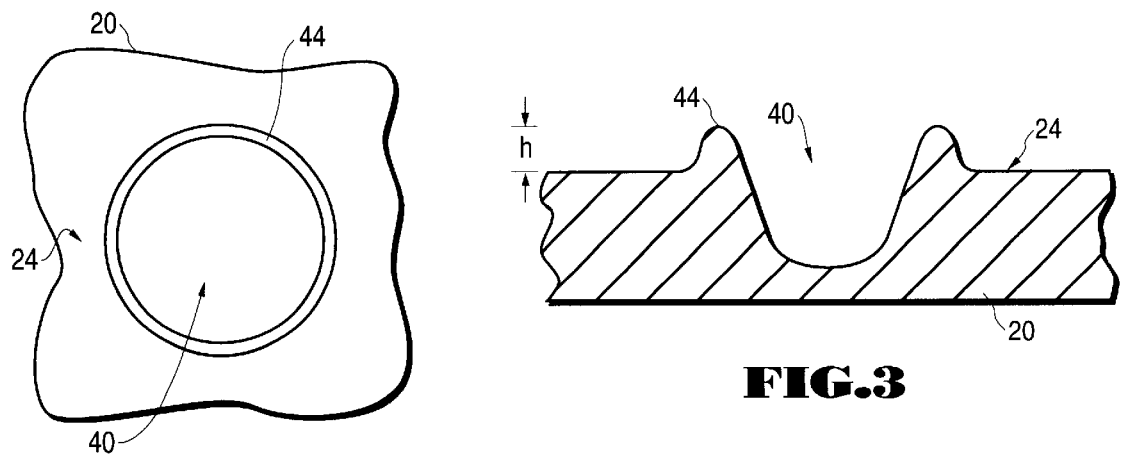
FIG.2  FIG.3
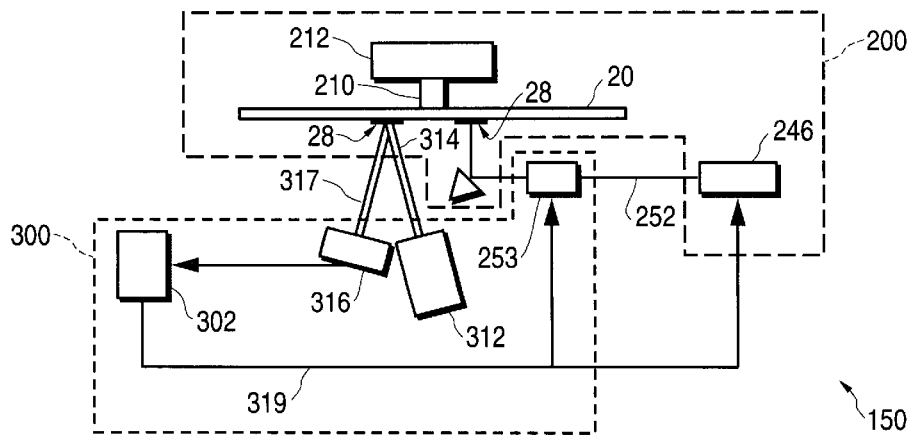
FIG.4

METHOD FOR LASER TEXTURING MAGNETIC RECORDING DISK

BACKGROUND OF THE INVENTION

1. Field of the Invention

This invention relates in general to laser bump texturing of surface portions of magnetic recording disks, and more particularly to in-situ texture bump height measurement for improved texturing process control.

2. Description of the Prior Art

Contact start/stop (CSS) disk drives operate with a slider in contact with the disk surface during start and stop operations when there is insufficient disk rotational speed to maintain the air bearing. However, after a slider has been in stationary contact with the disk for a period of time, the slider tends to resist translational movement or "stick" to the disk surface, a problem known as "stiction". To minimize the effect of stiction, CSS disk drives typically use a dedicated textured "landing zone" where the slider is parked when the drive is not operating. Typically, the disk substrate is textured before deposition of the magnetic layer and other layers that make up the magnetic recording disk. These layers replicate the texture of the underlying substrate and thus reduce the stiction where the slider is resting on the disk.

One technique for texturing the disk substrate is by pulsed laser radiation. U.S. Pat. No. 5,108,781, assigned to Magnetic Peripherals, Inc., describes a process for laser texturing by forming pits or craters in the substrate. U.S. Pat. Nos. 5,830,514, 5,550,696, 5,586,040, 5,822,211 and 5,658,475 describe devices and methods for laser texturing disk substrates. The problem discovered with current laser texturing devices and methods is that the average height of the laser-induced bumps can vary significantly from substrate to substrate, even when the substrates are presumably of the same material composition and the texturing laser energy is identical. Since the minimization of stiction is critically dependent on the average height of the bumps, it is necessary to develop a process that allows a texturing pattern with a known average bump height to be formed on all disks that are manufactured, thus assuring reliable operation of the disk drives into which the disks are incorporated. Additionally, the present invention facilitates the in-situ real time measurement of texture bump height, thus providing increased throughput as well as improved quality control in the disk texturing manufacturing process.

SUMMARY OF THE INVENTION

The invention is a method and apparatus for controlling the laser texturing of a magnetic disk using a textured laser system to create texturing bumps, and an analyzing laser system to determine texture bump height and to provide feedback to the texturing laser system. The analyzing laser system includes a scanning linear photodetector array that receives light diffracted from the textured disk surface to provide a digitized output that represents the angular distribution of diffracted light intensities. For crater shaped texture bumps the intensity of a first diffraction peak (Int1) and its array position (P1) are determined and utilized to calculate the average bump height h according to the equation:

$$h = A/P1 + B(Int1) + C$$

where A, B and C are constants. This equation represents a functional relationship between laser energy and bump height over a range of laser energies that produce the crater shaped bumps. The values of A, B and C are determined for a batch of disks by taking a representative sample of disks and texturing them with differing laser energies within the energy level range. The average bump height h of each of the sample disks is determined using an ex-situ device, and also Int1 and P1 for each disk are determined in-situ using the analyzing laser system. The ex-situ and in-situ results for the sample disks are mathematically compared and the value of the constants A, B and C for the batch of disks is mathematically derived. The bump height of a first textured disk can thereafter be determined in-situ using the analyzing laser system and the equation with the known values of A, B and C. The energy of the texturing laser can then be adjusted, if necessary, to alter the bump height of a second, subsequent disk, where the in-situ determined bump height of the first disk is unacceptable. The present invention therefore provides real-time feedback in the disk texturing process, such that the bump height of each disk is determined, and feedback for the texturing of subsequent disks is obtained. Manufacturing efficiency and throughput are increased utilizing the present invention.

It is an advantage of the present invention that the average bump height of crater shaped texture bumps can be determined in-situ.

It is another advantage of the present invention that texture bump height is correlatable with texturing laser energy, such that the average bump height determination for a first disk can be utilized to provide feedback for creating texture bumps on a second, subsequent disk.

It is a further advantage of the present invention that the average texture bump height on each manufactured disk can be easily and rapidly determined.

It is yet another advantage of the present invention that real-time feedback of texture bump height is provided during the manufacturing process.

It is yet a further advantage of the present invention that manufacturing efficiency and throughput is increased during the disk texturing portion of the manufacturing process.

These and other advantages of the present invention will become well understood by those skilled in the art upon reading the following detailed description, which makes reference to the several figures of the drawings.

IN THE DRAWINGS

FIG. 1 is a plan view of a typical hard disk drive illustrating the annular data region and the radially spaced annular textured band;

FIGS. 2 is a top plan view of a type of laser-induced texture bump having a crater-like shape;

FIG. 3 is a side cross sectional view of the texture bump depicted in FIG. 2;

FIG. 4 is a diagram of a disk texturing system of the present invention that uses a low power laser for analysis of bumps formed on a first disk to modify one or more texturing laser parameters to form texture bumps on a second disk;

DETAILED DESCRIPTION OF THE PREFERRED EMBODIMENTS

Figure 5:
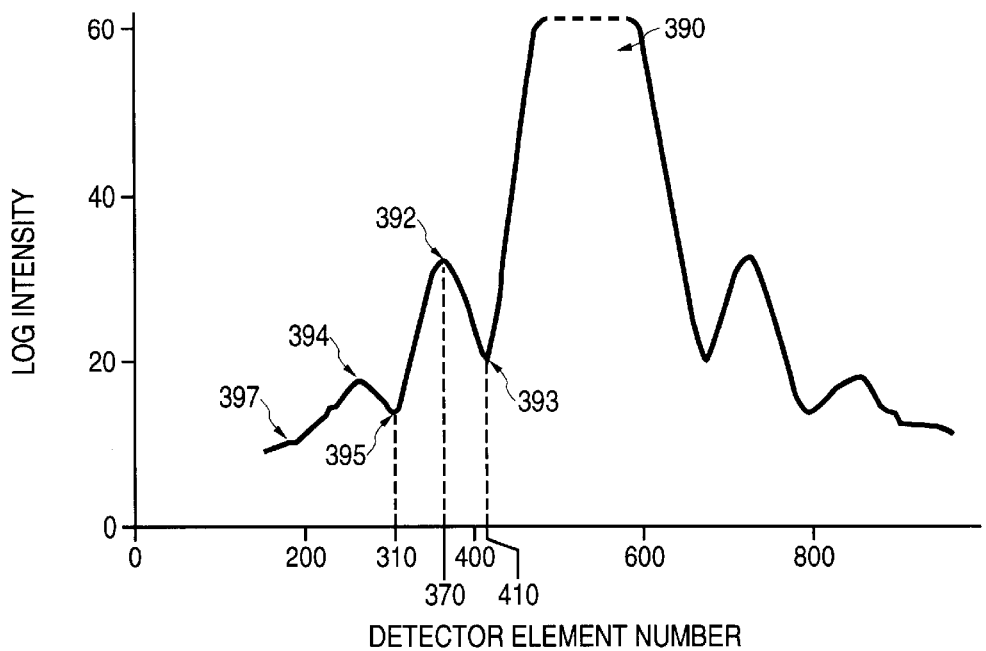
FIG. 5 is a graph of the digitized output of the scanning linear photodetector array showing the reflected laser light intensities from the disk as a function of diffraction angle.

FIG. 1 is a plan view of a hard disk drive 10, including a slider 14 that is supported on an arm 16 above a magnetic recording disk 20. The disk 20 is typically a thin film disk comprising a substrate, such as a disk blank made of glass, ceramic, or an aluminum-magnesium (AlMg) alloy with a nickel-phosphorus (NiP) surface coating, and a cobalt-based magnetic alloy film formed by sputter deposition over the substrate. To improve the wear resistance of the disk 20, as well as to maintain consistent magnetic properties in the data region, it is desirable to make the disk surface as smooth as possible. However, a very smooth disk surface 24 in a contact start/stop (CSS) disk drive can create what is called "stiction". This means that after a slider 14 has been in stationary contact with the disk 20 for a period of time, the slider 14 tends to resist translational movement or "stick" to the disk surface 24. Stiction is caused by a variety of factors, including static friction and adhesion forces between the disk and slider created by the lubricant or by capillary condensation of atmospheric water vapor. Stiction in the CSS disk drive can result in damage to the slider 14 or disk 20 when the slider suddenly breaks free from the disk surface 24 when disk rotation is initiated.

The conventional solution to the stiction problem is to texture the disk. As described in U.S. Pat. No. 5,108,781, assigned to Magnetic Peripherals, Inc., the disk substrate may be textured by laser heating to form a pattern of pits in the substrate surface. In a typical CSS disk drive, the disk 20 has a dedicated textured landing zone 28 near the disk inside diameter away from the disk data region 32, and the parking location for the slider 14 is in contact with the textured surface of the landing zone 28. At this location, the slider 14 is not in contact with the smooth data region 32 of the disk, and the disk drive 10 can be started without damage caused by stiction.

A textured landing zone 28 comprises a plurality of symmetrically-shaped, laser-induced bumps 40. Each of the bumps 40 is formed by a single laser pulse and results in a bump that can be formed with a diameter in the range of approximately 5–30 microns. The bumps 40 are typically formed by pulsing a laser beam on the NiP coatings of a AlMg disk while the disk 20 rotates, and if the disk is a conventional 3.5 in. disk the textured landing zone 28 has a typical radial dimension of approximately 3 mm. The bumps 40 may also be formed on other substrate materials, such as glass or ceramic (e.g., Memcor brand substrate from Corning Glass). Also, instead of being formed on the NiP disk substrate surface, the bumps 40 may be formed on one of the subsequently deposited disk layers, such as the disk protective overcoat.

FIG. 2 is an illustration of one type of laser-induced bump 40 formed on the smooth surface 24 of the disk 20, and FIG. 3 is a cross-sectional profile of bump 40. The bump 40 has the general shape of a crater with a circumferential rim 44 that is raised above the surface 24 of the disk 20 by a height represented by "h" in FIG. 3. The height h of the rim 44 is determined by the type of disk material and the laser parameters of pulse energy, pulse width, and spot size at the disk surface. To assure appropriate texturing of manufactured disks and to prevent stiction in disk drives, it is important that the heights of the bumps, i.e., the height h, of the rim 44 in bump 40 be consistent on each disk and from disk to disk during manufacturing.

FIG. 4 is a diagram of a texturing apparatus for forming textured bands, and for analyzing the textured band. The apparatus 150 is described in detail in U.S. Pat. No. 5,550, 696, assigned to International Business Machines, Inc., the disclosure of which is incorporated herein as though set forth in full. Briefly, the apparatus 150 includes a bump forming laser system 200 and a texture analyzing laser system 300. The disk 20 with textured band 28 is supported on a spindle 210 attached to drive motor 212. Bumps 40 having a height h in the range of approximately 5 to 30 microns can be formed with the beam 252 of the texturing laser 246, and the intensity and other parameters of the beam 252 are controllable utilizing laser control optical components generally described by the numeral 253 through which the laser beam 252 passes. For ease of illustration, the apparatus shown in FIG. 4 is depicted in operation for only one side of disk 20. However, in actual manufacturing the texturing laser beam 252 can be divided by a beam splitter (not shown) into two beams that are directed into two symmetric paths so that both sides of the disk 20 can be textured simultaneously.

The texture analyzing laser system illustrated in FIG. 4 is denoted as item 300 within the dashed lines. For ease of illustration, the system 300 is depicted in operation for only one side of disk 20. In actual manufacturing the system 300 is replicated on the opposite side of disk 20 so that both sides of the disk may be analyzed simultaneously. The primary components of the analyzing laser system 300 are a computerized signal processing system 302, a low-power continuous wave laser 312 that directs a laser light beam 314 onto the textured band 28, and a scanning linear photodetector array 316 that receives the light beam 317 that is reflected and diffracted from the bumps 40 within the textured band.

The general operation of the texture analyzing laser system 300 with the bump forming laser system 200 is that (a) the first texturing laser 246 operates at a controllable power and pulse width and forms crater shaped texture bumps 40 (of the type shown in FIGS. 2 and 3) in the annular textured band 28 of the disk 20; (b) the textured band 28 is then irradiated with beam 314 from second analyzing laser 312 and the diffracted beam 317 presents a diffraction pattern that is detected across a range of diffraction angles by array 316; (c) the output of array 316 is received by the computerized signal processing system 302 and, in the manner to be described below, is used to compute a value representative of the average height h of the bumps in the textured band 28; (d) in response to this computed average bump height value h, the computerized signal processing system 302 outputs a correction signal or signals through control line 319 to the laser 246 and/or the laser control optical components 253 to modify parameters of the texturing laser beam 252 for use on the textured band 28 of a second subsequent disk. The texture analyzing laser system 300 is thus used to provide automated real time feedback to the laser forming system 200. Alternatively, the texture analyzing laser system 300 may also function as a stand-alone or ex-situ system.

FIG. 5 shows a typical digitized output of array 316 representing the diffraction pattern spread across a range of angles as detected by detector elements (designated as 200 to 800) of the linear photodetector array 316. The individual peaks 392, 394 represent the envelopes of the intensity peaks, and the troughs 393, 395, 397 represent the intensity troughs between the peaks. The peak 390 represents the specular reflection from incident beam 314 and is of no interest in the diffraction pattern. The Y axis in FIG. 5 is the log of output intensity and the X axis represents the angle (in terms of numbered array detector element) away from the specularly reflected beam. The angular distribution of intensities shown in FIG. 5 is related to the average physical shape of the crater shaped bumps 40 illuminated by the light beam 314.

The discrete digital values corresponding to the output from array 316 are used to calculate characteristics of the angular distribution of light intensities. These calculated characteristics are directly related to the average height h of the rims 44 of the texture bumps 40 by which the incident laser light beam 314 was diffracted. In the present invention the characteristics of the angular distribution of light intensities that is used are the integrated intensity value (Int1) integrated over a portion of the angles near the first peak intensity 392, such as for example between detector elements 310 and 410 in FIG. 5 around peak 392 corresponding to the first diffraction peak from the center of the pattern, and the position (P1) of the first peak 392. This calculated integrated intensity value (Int1), along with the position (P1) (i.e., the number of the detector element, approximately detector element 370) is then used to determine the average bump height h as is described more fully hereinbelow.

Figure 6:
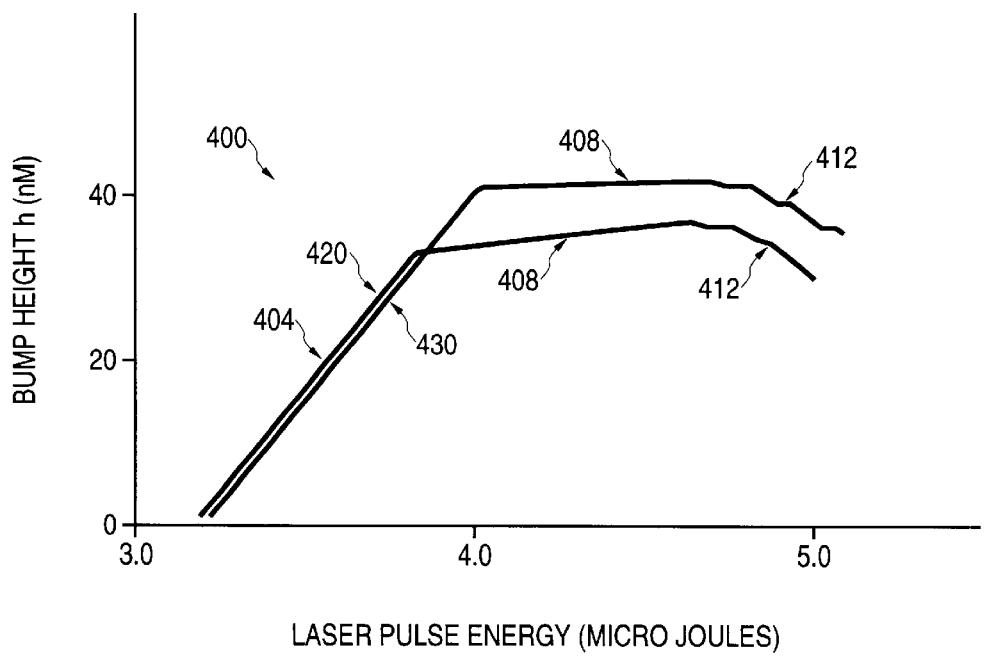
FIG. 6 is a graph showing average bump height as a function of laser energy for two laser textured disks.

FIG. 6 is a laser energy curve 400 that shows bump height h as a function of laser energy for the crater shaped bumps 40 depicted in FIGS. 2 and 3. The laser energy curve 400 can generally be thought of as having three portions, a first generally linear portion 404, in which increasing laser energy results in increasing bump height h, a second generally plateau region 408 in which increasing laser energy does not result in significantly increased bump height, and a third generally unpredictable region 412 in which further increased laser energy is not directly correlatable with bump height. Where prior art devices have generally operated in the plateau region 408 and with bumps having a central peak rather than a crater shape, the present invention utilizes laser energies in the linear region 404, such that variations in the laser energy are directly related to variations in bump height h for the crater shaped bumps 40 depicted in FIGS. 2 and 3.

In the linear region of the curve depicted in FIG. 6, the bump height h can be generally expressed by the equation:

$$h = A/P1 + B(Int1) + C$$

where A, B and C are constants. Where A, B and C are known quantities, a disk that has been textured by the texturing laser system 200 can thereafter be analyzed by the laser analyzing system 300 which measures P1 and Int1 and therefore determines the bump height h utilizing A, B and C in the equation set forth above. Additionally, the location of the first peak (P1) is a function of the texture analyzing laser energy, such that by adjusting the analyzing laser energy, P1 can be made constant, whereupon h becomes a variable of only Int1. Where the determined bump height h is too high or too low, the texturing laser energy is adjusted by control signals through line 319 to the laser 246 and/or the optical control components 253. The control signals are generated by the computerized signal processing system 302 utilizing the linear portion 404 of the curve 400 in FIG. 6, such that the bump height h of a second, subsequent disk is within acceptable parameters. Therefore, the process of the present invention determines the bump height h of a first disk using the equation given above to provide control parameters for texturing the subsequent disk. The derivation of the constants A, B and C is next discussed.

In the disk manufacturing process, disks for texturing are generally received in batches, wherein individual disks tend to be very similar, although individual disks within the batch may occasionally vary significantly from the norm. The disk quality of significance in the texturing step is the bump height h that is produced in the disk surface in response to particular texturing laser energies. In this regard, FIG. 6 depicts two bump height versus energy curves for two disks within a batch. As is seen in FIG. 6, curve 420 for a first disk has the three generalized portions discussed hereabove; that is, a linear portion 404, a plateau portion 408 and an unpredictable portion 412. Likewise, curve 430 for the second disk has a linear portion 404, plateau portion 408 and an uncontrolled portion 412. It is significant that the linear portions 404 of the curves 420 and 430 of the two disks are very similar, whereas the plateau portions 408 and unpredictable portions 412 differ. Specifically, within the linear curve portion 404, each disk responds very similarly in producing bump heights h for similar texturing laser energy levels. It is this disk to disk similarity in the linear portion 404 of the curves 420 and 430 depicted in FIG. 6 that enables the present invention. That is, where a particular laser energy on a first disk produces a particular bump height h, it is generally the case that the same laser energy will produce the same bump height on the second disk. Therefore, where the bump height h of the first disk is not within a predetermined acceptable range, the texturing laser energy that was used on the first disk can be adjusted for use on the second, subsequent disk with confidence that the bump height h of the subsequent disk will be suitably altered by the altered energy level from the texturing laser.

The constants A, B and C are derived for a batch of disks to be textured by selecting a random sample of disks from the batch for ex-situ testing to create the linear portion 404 of the curve 400 depicted in FIG. 6. For example, assuming a batch of 1,000 disks are to be textured, a random sample of 10 disks are selected for initial texturing. Each disk is exposed to a different texturing laser energy level within the general linear energy level portion 404 of the curve 400. After texturing, each disk is analyzed using the in-situ laser system 300 to determine P1 and Int1 for the texturing bumps of each disk. Additionally, the bump height h is also measured utilizing an ex-situ measuring instrument, such as an inferometer, a scanning tunneling microscope (STM) or atomic force microscope (AFM). These instruments can measure the height h of the bump rim 44 of the laser bumps 40 with an accuracy of approximately 1 nm. Thereafter, the ex-situ bump height measurements for the ten disks are mathematically compared with the in-situ laser system bump height measurement for the ten disks. Utilizing a mathematical process, such as a least-squares process or some other type of regression technique, the constants A, B and C are mathematically derived for this batch of disks and the bump height vs. laser energy data represented by the curve set forth in FIG. 6 is created and stored in the computer memory of the computerized signal processing system 302. It is also the case that P1 is inversely proportional to the bump radius for laser energy levels within the general linear energy level portion 404 of the curve 400 for the crater shaped bumps described herein. The ex-situ measuring instruments are also capable of measuring the bump radius to a high degree of accuracy, and the relationship between the bump radius and P1 can be used to help in the mathematical derivation of the values of the constants A, B and C.

In commencing the texturing process for manufacturing the disks, the desired bump height h, within a bump height parameter range for the textured zone 28 of the disks 20, is known. Based on the FIG. 6 curve data, the initial energy level of the texturing laser 246 is determined. A first disk is then textured utilizing the predetermined initial energy level and thereafter analyzed in-situ utilizing the laser system 300 and the equation given above. If the determined bump height h of the disk falls within the acceptable bump height range, the disk is accepted. Conversely, if the determined bump height h falls outside of the acceptable range, the textured disk is rejected and the texturing laser energy is adjusted by the computerized signal processing system 302 through control line 319, pursuant to the disk batch data curve of FIG. 6, to produce bumps within the acceptable range on a second, subsequent disk. In this manner, each disk in the batch is textured and in-situ tested. Feedback during the texturing process is obtained to produce optimum results. Manufacturing efficiency and throughput are thus increased utilizing the present invention.

While the preferred embodiments of the present invention have been illustrated in detail, it should be apparent that modifications and improvements may be made to the invention without departing from the spirit and scope of the invention as described in the following claims.

What is claimed is:

1. A method for laser texturing a magnetic recording disk comprising the steps of:
   rotating the disk to be textured;
   irradiating the rotating disk with laser pulses from a first laser to form a pattern of individual texturing bumps;

directing a laser light beam from a second laser onto the band of texturing bumps on the rotating disk, the directed second laser light beam having a diameter sufficient to cover a plurality of the texturing bumps and being oriented to strike the disk at a position such that the second laser light beam incident on the disk is reflected and diffracted by the texturing bumps;

scanning with a photodetector array the second laser's light diffracted from the bumps on the disk through a range of angles, and providing an array output signal;

generating from the array output signal a set of discrete digital values representative of the intensity of the light reflected from the bumps in the band at a like set of angles;

determining the average texturing bump height by utilizing the linear relationship:

$$h=A/P1+B(Int1)+C$$

wherein h is the average bump height, A, B, C are constants and wherein Int1 and P1 are calculated from said set of discrete digital values, wherein Int1 is an integration of intensities over a portion of the range of angles near a first peak intensity, and wherein P1 represents the angle of location of the first peak.

2. A method for laser texturing a magnetic recording disk as described in claim 1 wherein said individual texturing bumps are crater shaped, having a raised rim and a depressed central area.

3. A method for laser texturing a magnetic recording disk as described in claim 1 wherein A, B and C are determined by:

selecting a plurality of disks from a batch of disks;

forming texturing bumps on each disk of said plurality of disks using a different texturing laser energy level;

measuring the average bump height (h) of said texturing bumps on each said disk utilizing an ex-situ measuring device;

determining a linear relationship between bump height h measured above using said ex-situ measuring device and said different laser texturing energies utilized above;

determining Int1 and P1 for each said disk;

utilizing h measured above for each disk and Int1 and P1 for each disk, mathematically determining the values A, B and C that best fit the bump height h versus texturing laser energy linear relationship.

4. A method for the laser texturing of a plurality of magnetic recording disks, comprising the steps of:

a) exposing a rotating first disk to a texturing laser having a first laser energy level to create a plurality of texturing bumps on said first disk;

b) determining the average bump height of said texturing bumps produced on said disk by utilizing the linear relationship:

$$h=A/P1+B(Int1)+C;$$

wherein h is the average bump height, A, B, C are constants, and wherein Int1 and P1 are parameters related to the average height of texturing bumps that are determined by the steps of:

i) directing a laser light beam from a second laser onto the texturing bumps on the rotating disk, the directed second laser light beam having a diameter sufficient to cover a plurality of the texturing bumps and being oriented to strike the disk at a position such that the second laser light beam incident on the disk is reflected and diffracted by the texturing bumps;

ii) scanning with a photodetector array the second laser's light diffracted from the bumps on the disk through a range of angles, and providing an array output signal;

iii) generating from the array output signal a set of discrete digital values representative of the intensity of the light reflected from the bumps in the band at the like set of angles;

iv) calculating Int1 and P1 from said set of discrete digital values, wherein Int1 is an integration of intensities over a portion of the range of angles near a first peak intensity, and wherein P1 represents the angle of location of the first peak;

c) determining whether said average bump height is within a predetermined acceptable bump height range;

d) determining whether to accept or reject said disk based upon said determination of whether said average bump height is within said range;

e) adjusting the laser energy level of said texturing laser to an adjusted laser energy level when said average bump height is not within said range;

f) exposing a rotating subsequent disk to said texturing laser having said adjusted laser energy level to create a plurality of texturing bumps on said subsequent disk; and g) repeating steps b, c, d, e and f on said subsequent disk, and further subsequent disks of a plurality of disks.

5. A method for laser texturing a plurality of magnetic recording disks as described in claim 4 wherein said individual texturing bumps are crater shaped, having a raised rim and a depressed central area.

6. A method for texturing a plurality of magnetic recording disks as described in claim 4 wherein A, B and C are determined by:

selecting a plurality of disks from a batch of disks;

forming texturing bumps on each disk of said plurality of disks using a different texturing laser energy level;

measuring the average bump height (h) of said texturing bumps on each said disk utilizing an ex-situ measuring device;

determining a linear relationship between bump height h measured above using said ex-situ measuring device and said different laser texturing energies utilized above;

determining Int1 and P1 for each said disk;

utilizing h measured above for each disk and Int1 and P1 for each disk, mathematically determining the values A, B and C that best fit the bump height h versus texturing laser energy linear relationship.

* * * * *